United States Patent
Kwak et al.

(10) Patent No.: US 7,439,792 B2
(45) Date of Patent: Oct. 21, 2008

(54) HIGH VOLTAGE GENERATION CIRCUIT AND SEMICONDUCTOR DEVICE HAVING THE SAME

(75) Inventors: Pan-Suk Kwak, Gyeonggi-do (KR); Dae-Seok Byeon, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 26 days.

(21) Appl. No.: 11/549,411

(22) Filed: Oct. 13, 2006

(65) Prior Publication Data

US 2007/0090871 A1   Apr. 26, 2007

(30) Foreign Application Priority Data

Oct. 26, 2005   (KR) ...................... 10-2005-0101338

(51) Int. Cl.
*H03K 3/10* (2006.01)
(52) U.S. Cl. ..................... 327/534; 327/537; 327/590
(58) Field of Classification Search ................. 327/534, 327/537, 590
See application file for complete search history.

(56) References Cited

U.S. PATENT DOCUMENTS

| | | | | |
|---|---|---|---|---|
| 5,534,823 A | * | 7/1996 | Kondou ........................ 331/16 |
| 6,181,629 B1 | | 1/2001 | Ogura ........................ 365/277 |
| 6,356,488 B1 | * | 3/2002 | Kang ..................... 365/189.09 |
| 6,674,317 B1 | * | 1/2004 | Chou .......................... 327/536 |
| 6,759,912 B2 | * | 7/2004 | Yamagishi et al. ............. 331/17 |
| 7,176,747 B2 | * | 2/2007 | Lee et al. ..................... 327/536 |

FOREIGN PATENT DOCUMENTS

| | | |
|---|---|---|
| JP | 2001-006382 | 1/2001 |
| JP | 2003-033006 | 1/2003 |
| KR | 0157343 | 7/1998 |

OTHER PUBLICATIONS

English language abstract for Korean Publication No. 0157343.
English language abstract for Japanese Publication No. 2001-006382.
English language abstract for Japanese Publication No. 2003-033006.

* cited by examiner

*Primary Examiner*—N. Drew Richards
*Assistant Examiner*—An T. Luu
(74) *Attorney, Agent, or Firm*—Marger Johnson & McCollom, P.C.

(57) ABSTRACT

A high voltage generation circuit includes a pump clock generation unit configured to generate a pump clock signal in response to a pumping enable signal, a charge pump configured to generate a high voltage on an output in response to the pump clock signal, and a switching unit to selectively couple the output of the charge pump to an output node in response to the pumping enable signal.

18 Claims, 7 Drawing Sheets

HIGH VOLTAGE GENERATION CIRCUIT AND SEMICONDUCTOR DEVICE HAVING THE SAME

CROSS-REFERENCE TO RELATED PATENT APPLICATIONS

This application claims the benefit of Korean Patent Application No. 10-2005-101338, filed on Oct. 26, 2005, in the Korean Intellectual Property Office, the disclosure of which is incorporated herein in its entirety by reference.

BACKGROUND

1. Technical Field

This disclosure relates to a semiconductor integrated circuit (IC), and more particularly, to a high voltage generation circuit which generates a high voltage using a charge pumping method for a semiconductor IC.

2. Description of the Related Art

In general, semiconductor devices may require a voltage higher than a power voltage level supplied from an external source. For example, a flash memory device requires a high voltage in order to program or erase a memory cell. A circuit within the semiconductor device generating a voltage higher than an external voltage is referred to as a high voltage generation circuit or a boost circuit.

A charge pump circuit is usually used as the high voltage generation circuit. The charge pump circuit has one or more capacitors and generates a high voltage by pumping electric charges to the capacitors. A typical charge pump circuit is disabled when an output voltage reaches a predetermined target voltage. When disabled, the output voltage of the charge pump circuit is reset to a power voltage. The output voltage of the charge pump circuit is discharged to a power voltage level. As a result, the charges stored in the capacitors of the charge pump circuit are lost. Thus, when the charge pump circuit is enabled again, it takes time for the output voltage to replace the lost charges and reach the target voltage level, increasing the power consumption. As a result, there remains a need for a method to rapidly output a target voltage when a disabled charge pump circuit is enabled.

SUMMARY

An embodiment includes a high voltage generation circuit including a pump clock generation unit configured to generate a pump clock signal in response to a pumping enable signal, a charge pump configured to generate a high voltage on an output in response to the pump clock signal, and a switching unit to selectively couple the output of the charge pump to an output node in response to the pumping enable signal.

Another embodiment includes a method of generating a high voltage for a semiconductor circuit including generating a high voltage on an output node with a charge pump in response to a first state of a pump enable signal, deactivating the charge pump in response to a second state of the pump enable signal, and decoupling an output of the charge pump from the output node.

BRIEF DESCRIPTION OF THE DRAWINGS

The above and other features and advantages will become more apparent by describing in detail preferred embodiments with reference to the attached drawings in which.

DETAILED DESCRIPTION

Figure 1A:
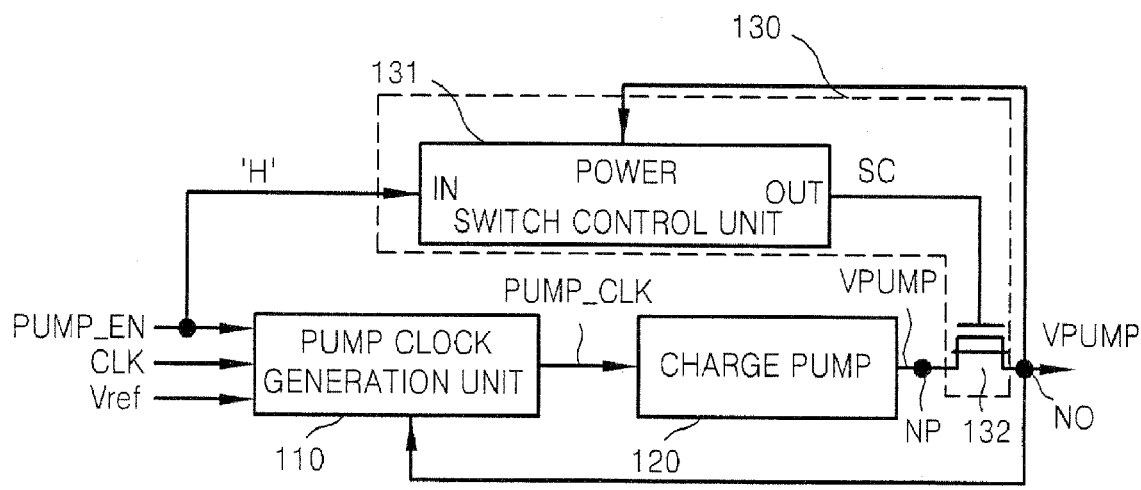
FIGS. 1A and 1B are block diagrams of a high voltage generation circuit according to an embodiment.
Figure 1B:
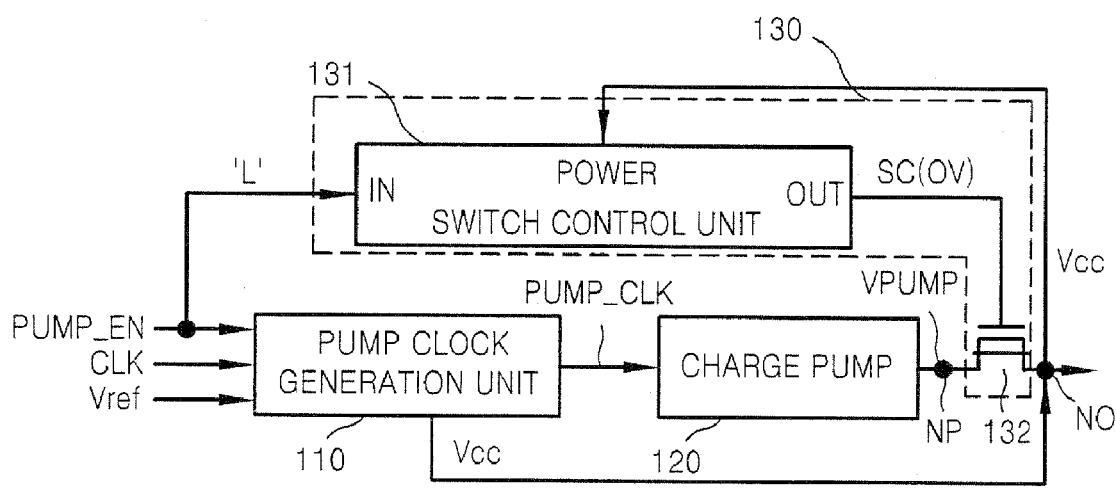

FIG. 1A is block diagram of a high voltage generation circuit according to an embodiment when a pump enable signal PUMP_EN is active, and FIG. 1B is block diagram of a high voltage generation circuit according to an embodiment when the pump enable signal PUMP_EN is inactive.

Referring to FIGS. 1A and 1B, a high voltage generation circuit according to an embodiment includes a pump clock generation unit 110, a charge pump unit 120, and a switching unit 130. The pump clock generation unit 110 generates a pump clock signal PUMP_CLK to control the operation of the charge pump unit 120 in response to the pump enable signal PUMP_EN. The charge pump unit 120 generates a high voltage pump output voltage VPUMP by performing a pumping operation in response to a pump clock signal PUMP_CLK. To determine when the pump output voltage VPUMP output from the charge pump unit 120 reaches a predetermined target voltage level, the pump clock generation unit 110 is coupled to a final output node NO. When the voltage of the final output node NO or a voltage obtained by dividing the voltage of the final output node NO is higher than a predetermined reference voltage, the pump clock generation unit 110 disables the output of the pump clock signal PUMP_CLK. While the charge pump unit 120 is enabled, the voltage of the final output node NO increases towards the pump output voltage VPUMP. When the output of the pump clock signal PUMP_CLK is disabled, the charge pump unit 120 is disabled.

Figure 2:
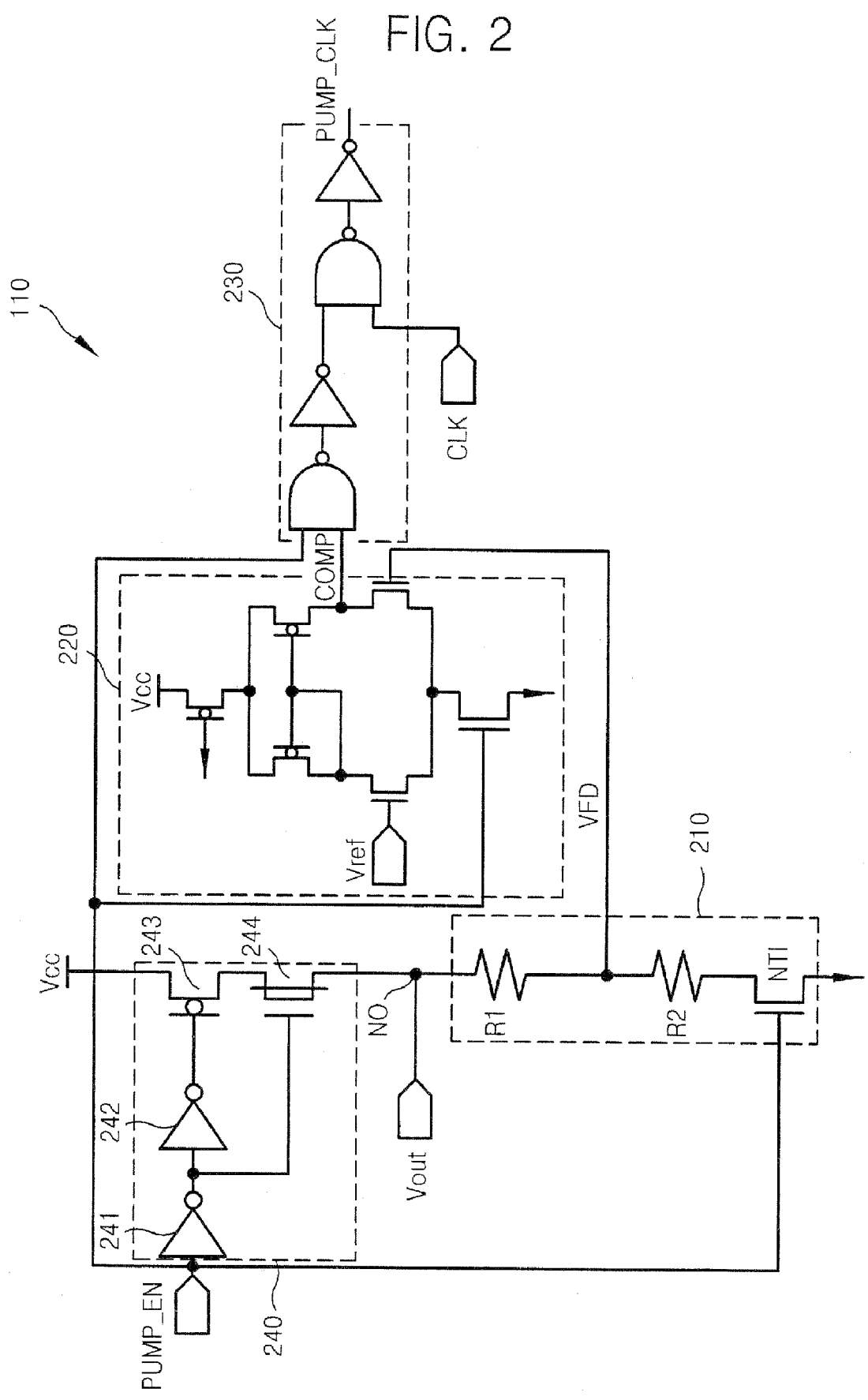
FIG. 2 is a circuit diagram of an example of the pump clock generation unit shown in FIGS. 1A and 1B.

FIG. 2 is a circuit diagram of an example of the pump clock generation unit shown in FIGS. 1A and 1B. Referring to FIG. 2, the pump clock generation unit 110 includes a voltage divider 210, a comparator 220, a logic unit 230, and a disable path unit 240.

The voltage divider 210 outputs a divided voltage VFD obtained by dividing a voltage Vout of the final output node NO using resistors R1 and R2 coupled in series. Specifically, the voltage divider 210 includes the resistors R1 and R2 and an NMOS transistor NT1 coupled in series between the final output node NO and a ground node. The NMOS transistor NT1 is turned on or off in response to the pump enable signal PUMP_EN to selectively form an electric path between the output node NO and the ground node through the resistors R1 and R2.

The comparator 220 compares the output voltage of the voltage divider 210, the divided voltage VFD, with a predetermined reference voltage Vref. When the divided voltage VFD is higher than the reference voltage Vref, the comparator 220 outputs a comparison signal COMP having a low level.

When the divided voltage VFD is lower than the reference voltage Vref, the comparator 220 outputs a comparison signal COMP having a high level.

The logic unit 230 performs an AND-operation on the pump enable signal PUMP-EN and the comparison signal COMP. An AND-operation between the result of the previous AND-operation and the clock signal CLK generates the pump clock signal PUMP_CLK. Thus, when the pump enable signal PUMP_EN is active at a high level and the comparison signal COMP is a high level, that is, when the divided voltage VFD is lower than the reference voltage Vref, the clock signal CLK is output as the pump clock signal PUMP_CLK. In contrast, when the pump enable signal PUMP_EN is inactive, or the comparison signal COMP is at a low level, indicating that the divided voltage VFD is higher than the reference voltage Vref, the pump clock signal PUMP_CLK is maintained at the low level.

Although particular logic levels, signal states, and logic circuits have been described, one of ordinary skill in the art will understand that such logic levels, signal states, and logic circuits may be modified to accommodate the characteristics of various components. For example, the pump enable signal PUMP_EN may be an active low signal and the pump clock generation unit 110 may be adjusted accordingly.

The disable path unit 240 pulls the final output node NO to a power voltage level when the pump enable signal PUMP_EN is inactive at a low level. The disable path unit 240 includes a PMOS transistor 243, a depletion transistor 244, and inverters 241 and 242. The PMOS transistor 243 and the depletion transistor 244 are turned on or off according to the pump enable signal PUMP_EN. Specifically, when the pump enable signal PUMP_EN is active, the PMOS transistor 243 and the depletion transistor 244 are all turned off so that the final output node NO is electrically separated from a power voltage (Vcc) node. As the final output node NO is coupled to a pump output node NP by a switch 132 shown in FIGS. 1A and 1B, the pump output voltage VPUMP can be input to other circuit blocks through the final output node NO.

When the pump enable signal PUMP_EN is inactive, the PMOS transistor 243 and the depletion transistor 244 are all turned on so that the final output node NO is electrically coupled to the power voltage (Vcc) node. As the final output node NO is separated from the pump output node NP by the switch 132, the final output node NO is biased to the power voltage (Vcc) level.

The charge pump unit 120 pumps charges in response to the pump clock signal PUMP_CLK to generate a high voltage pump output voltage VPUMP.

Figure 3:
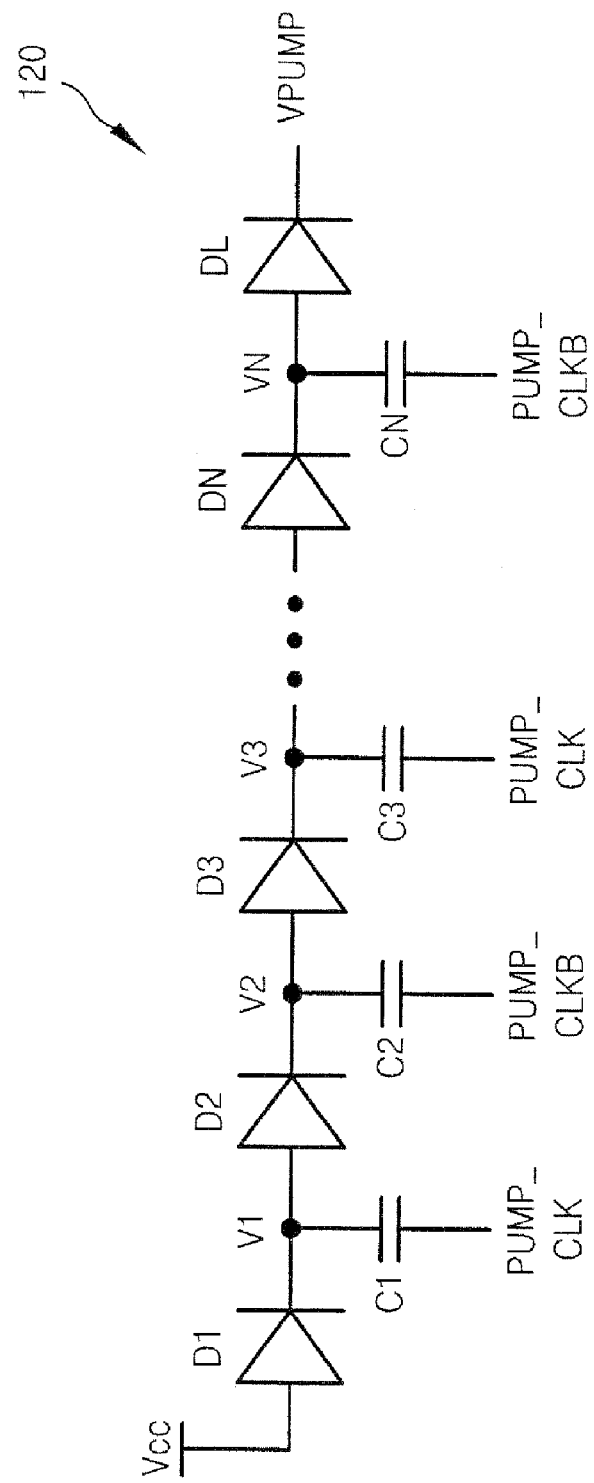
FIG. 3 is a circuit diagram of an example of the charge pump unit shown in FIGS. 1A and 1B.
Figure 7A:
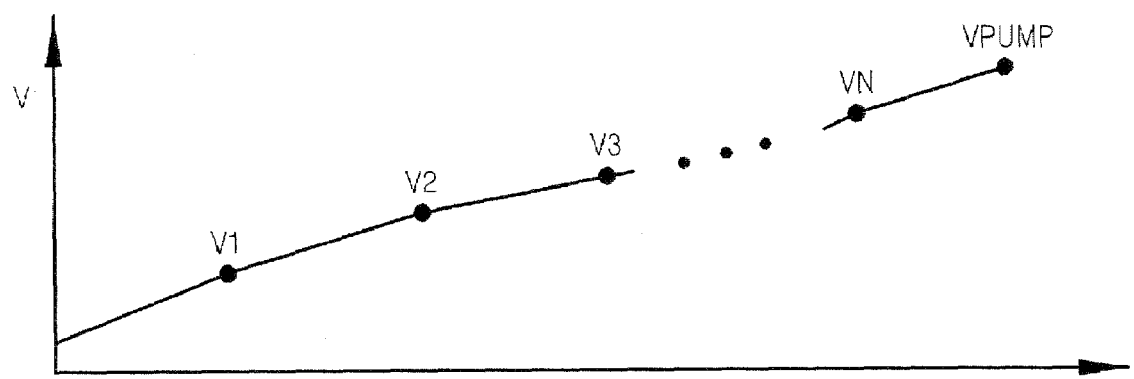
FIGS. 7A and 7B are graphs showing the voltage levels of capacitor nodes in the charge pump unit.

FIG. 3 is a circuit diagram of an example of the charge pump unit shown in FIGS. 1A and 1B. Referring to FIG. 3, the charge pump unit 120 includes diodes D1-DN and DL and capacitors C1-CN. In FIG. 3, the diodes D1-DN and DL are coupled in series between the power voltage (Vcc) node and the pump output (VPUMP) node. Each of the capacitors C1-CN has one port coupled to a node between two diodes and another port to receive either the pump clock signal PUMP_CLK or an inverted pump clock signal PUMP_CLKB. The charge pump unit 120 configured as above pumps charges in response to the pump clock signal PUMP_CLK and the reverse pump clock signal PUMP_CLKB so that the voltages V1-VN of the respective capacitor nodes gradually increase as shown in FIG. 7A. Consequently, a high voltage pump output voltage VPUMP is generated.

The charge pump unit 120 shown in FIG. 3 is a typical charge pump circuit. However, the charge pump unit 120 is not limited to the configuration shown in FIG. 3.

Referring back to FIGS. 1A and 1B, the switching unit 130 selectively connects the output node NP (or the pump output node) of the charge pump unit 120 to the final output node NO in response to the pump enable signal PUMP_EN. Specifically, when the pump enable signal PUMP_EN is inactive, the pump output node NP is electrically separated from the final output node NO to float the pump output node NP. When the pump enable signal PUMP_EN is active, the pump output node NP is coupled to the final output node NO.

When the output node of the charge pump unit 120 is in a floating state, the loss of the charge stored in the capacitors C1-CN in the charge pump unit 120 is decreased.

The switching unit 130 includes a switch control unit 131 and the switch 132. The switch 132 may be a high voltage depletion transistor. The drain port and the source port of the transistor are coupled to the pump output node NP and the final output node NO, respectively. A switch control voltage SC output from the switch control unit 131 is applied to the gate port of the transistor.

The switch control unit 131 has a power port POWER to receive the pump output voltage VPUMP, an input port IN to receive the pump enable signal PUMP_EN, and an output port OUT to output the switch control voltage SC.

Referring to FIG. 1A, in the operation of the high voltage generation circuit according to an embodiment, when the pump enable signal PUMP_EN is active at a high level "H", the pump clock generation unit 10 generates the pump clock signal PUMP_CLK. Then, the charge pump unit 120 pumps charges to the respective capacitors C1-CN in response to the pump clock signal PUMP_CLK to generate a high voltage pump output voltage VPUMP.

The switch control unit 131 connects the power port POWER and the output port OUT to output the switch control voltage SC that is a high voltage (VPUMP). Accordingly, the switch 132 is turned on and the pump output node NP and the final output node NO are electrically coupled. As a result, the pump output voltage VPUMP output from the charge pump unit 120 is output through the final output node NO. The pump output voltage VPUMP output through the final output node NO is fed back to the power port POWER of the switch control unit 131 and the pump clock generation unit 110. Thus, the pump output voltage VPUMP fed back to the pump clock generation unit 110 is divided into the divided voltage VFD and compared with the reference voltage Vref. Since the pump clock signal PUMP_CLK is continuously generated until the divided voltage VFD is higher than the reference voltage Vref, the pump output voltage VPUMP increases to a predetermined target voltage level.

Referring to FIG. 1B, in the operation of the high voltage generation circuit according to an embodiment, when the pump enable signal PUMP_EN is inactive at a low level "L", the pump clock generation unit 110 disables the generation of the pump clock signal PUMP_CLK. In other words, the output signal of the pump clock generation unit 110 has a constant low level. As a result, the charge pump unit 120 is disabled.

The switch control unit 131 outputs the switch control voltage SC that is 0V. Thus, the switch 132 is turned off and the pump output node NP is electrically separated from the final output node NO, causing it to float. The power voltage Vcc is applied to the final output node NO by the disable path unit 240 of the pump clock generation unit 110. Accordingly, the voltage of the final output node NO becomes the power voltage level. The voltage of the final output node NO having the power voltage level is input to the power port of the switch control unit 131.

Since the pump output node NP is floating in the pump disable state, the capacitors C1-CN in the charge pump unit 120 are not discharged. As a result, the voltages V1-VN of the capacitor nodes maintain the voltage level as in the pump enable state.

Figure 4:
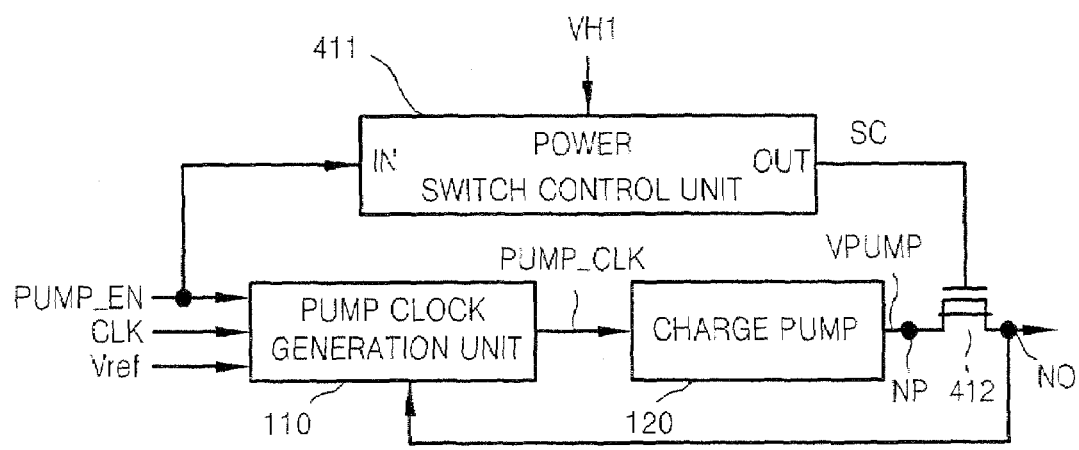
FIG. 4 is a block diagram of a high voltage generation circuit according to another embodiment.

FIG. 4 is a block diagram of a high voltage generation circuit according to another embodiment. Referring to FIG. 4, the high voltage generation circuit includes the pump clock generation unit 110, the charge pump unit 120, and switching units 411 and 412. The difference between the high voltage generation circuit of FIGS. 1A and 1B and the high voltage generation circuit of FIG. 4 is that the voltage of the final output node NO is input to the power port POWER of the switch control unit 131 of the high voltage generation circuit of FIGS. 1A and 1B while a first high voltage VH1 is separately input to the power port POWER of the switch control unit 411 of the high voltage generation circuit of FIG. 4. The first high voltage VH1 has a level that is the same or higher than the pump output voltage VPUMP.

Figure 5:
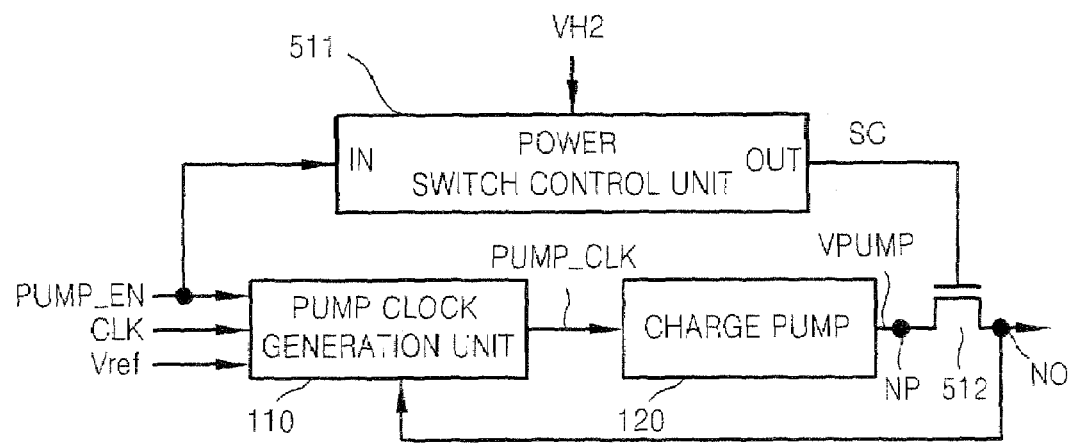
FIG. 5 is a block diagram of a high voltage generation circuit according to yet another embodiment.

FIG. 5 is a block diagram of a high voltage generation circuit according to another embodiment. Referring to FIG. 5, the high voltage generation circuit includes the pump clock generation unit 110, the charge pump unit 120, and switching units 511 and 512. The difference between the high voltage generation circuit of FIG. 4 and the high voltage generation circuit of FIG. 5 is that the switch 412 of the high voltage generation circuit of FIG. 4 includes a depletion mode transistor while the switch 512 of the high voltage generation circuit of FIG. 5 includes an enhancement mode transistor. Thus, a switch control voltage SC' to turn on the enhancement mode transistor 512 has a level higher than the switch control level SC that is applied to the depletion transistor. Thus, a second high voltage VH2 input to the power port POWER of the switch control unit 512 has a voltage level higher than the first high voltage VH1.

Figure 6A:
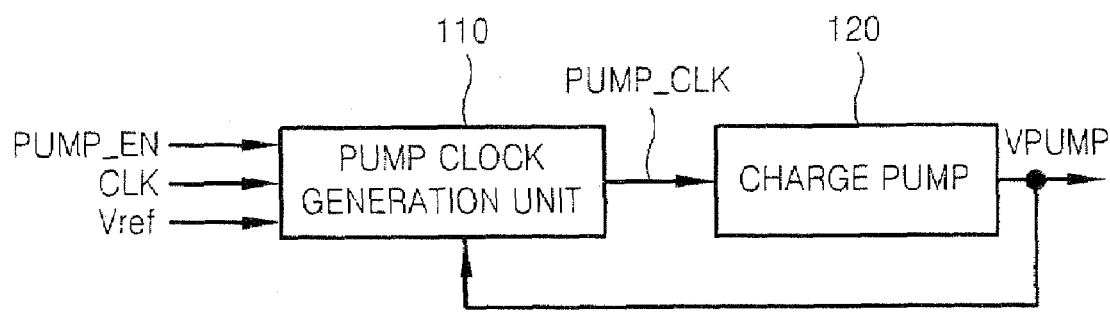
FIGS. 6A and 6B are block diagrams of the high voltage generation circuit of FIGS. 1A and 1B where the switching unit is omitted.
Figure 6B:
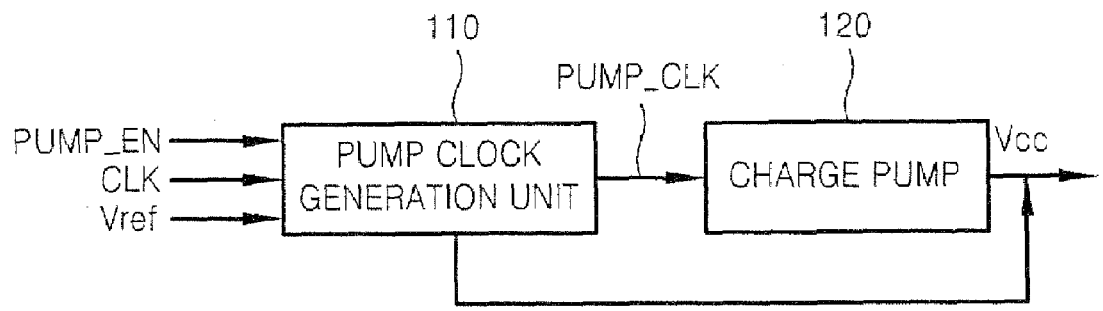

FIGS. 6A and 6B are block diagrams of the high voltage generation circuit of FIGS. 1A and 1B where the switching unit is omitted. That is, FIGS. 6A and 6B show a high voltage generation circuit having the pump clock generation unit 110 and the charge pump unit 120, but not the switching unit 130. FIGS. 6A and 6B show a case of the pump enable signal PUMP_EN being active and a case of the pump enable signal PUMP_EN being inactive, respectively.

When the pump enable signal PUMP_EN is active, the pump clock signal PUMP_CLK is generated by the pump clock generation unit 110. The charge pump unit 120 pumps charges to the respective capacitors in response to the pump clock signal PUMP_CLK to generate the pump output voltage VPUMP having a high voltage.

When the pump enable signal PUMP_EN is inactive, the charge pump unit 120 is disabled. In this state, the power voltage Vcc is applied to the output node of the charge pump unit 120 through the disable path unit 240 of the pump clock generation unit 110. Thus, the output voltage of the charge pump unit 120 is biased to a power voltage (Vcc) level. When the charge pump unit 120 is disabled, the output voltage of the charge pump unit 120 decreases to the power voltage level. Accordingly, as shown in FIG. 7B, each capacitor in the charge pump unit 120 is discharged so that the voltages V1-VN of the capacitors decrease as well.

As the voltage level of each capacitor of the charge pump unit 120 is lowered, when the charge pump unit 120 is enabled again, a long period of time and a large amount of power are needed to recharge the capacitors. Consequently, more time and power is needed for the charge pump unit 120 to output the pump output voltage VPUMP having a target voltage level. In particular, when the pump efficiency of the charge pump unit 120 is less than 10%, a correspondingly larger amount of power is consumed which is considerably disadvantageous in the field of mobile technology.

Figure 7B:
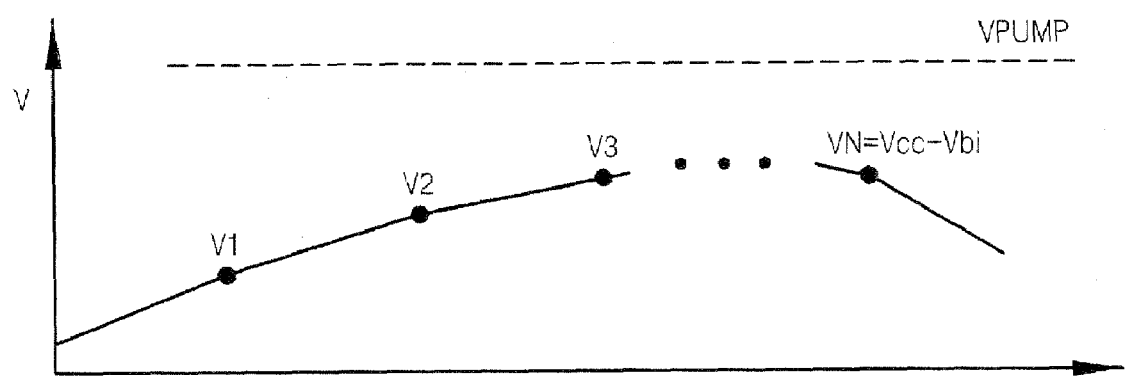

FIGS. 7A and 7B are graphs showing the voltage levels of capacitor nodes in the charge pump unit. FIG. 7A shows the voltages V1-VN of the capacitor nodes and the pump output voltages VPUMP when the charge pump unit 120 is enabled in the high voltage generation circuit according to an embodiment. As shown in FIG. 7A, the voltages V1-VN of the capacitor nodes gradually increase so that the pump output voltage VPUMP that is a high voltage is generated.

For the high voltage generation circuit shown in FIGS. 6A and 6B, the voltages V1-VN of the capacitor nodes and the pump output voltages VPUMP when the charge pump unit 120 is enabled are the same as those shown in FIG. 7A.

FIG. 7B shows the voltages V1-VN of the capacitor nodes and the pump output voltages VPUMP when the charge pump unit 120 is disabled in the high voltage generation circuit shown in FIGS. 6A and 6B. In the high voltage generation circuit shown in FIGS. 6A and 6B, when the charge pump unit 120 is disabled, since the output voltage of the charge pump unit 120 becomes the power voltage (Vcc) level, as shown in FIG. 7B, the voltage VN of the preceding node of the output node of the charge pump unit 120 is lowered to a value "Vcc-Vbi". Accordingly, the voltages V1, V2, V3, and so on of the other nodes are gradually lowered as well. The Vbi is a built-in voltage of the diode DL.

In contrast, according to an embodiment, by preventing the discharge of the capacitors in the charge pump unit 120 in the pump disable state, each node almost maintains the voltage level in the pump enable state. For example, the voltage levels of the respective nodes shown in FIG. 7A are almost maintained. When the pump output node is floating, the charge on the capacitors are slightly and naturally discharged so that the node voltages V1-VN are lowered. However, a voltage level quite higher than the voltage of each node when the power voltage is applied to the pump output node NP can be maintained. Therefore, when the charge pump unit 120 is enabled again, the pump output voltage VPUMP can reach a target voltage level more rapidly by the charges charged in the respective capacitors of the charge pump unit 120.

Figure 8:
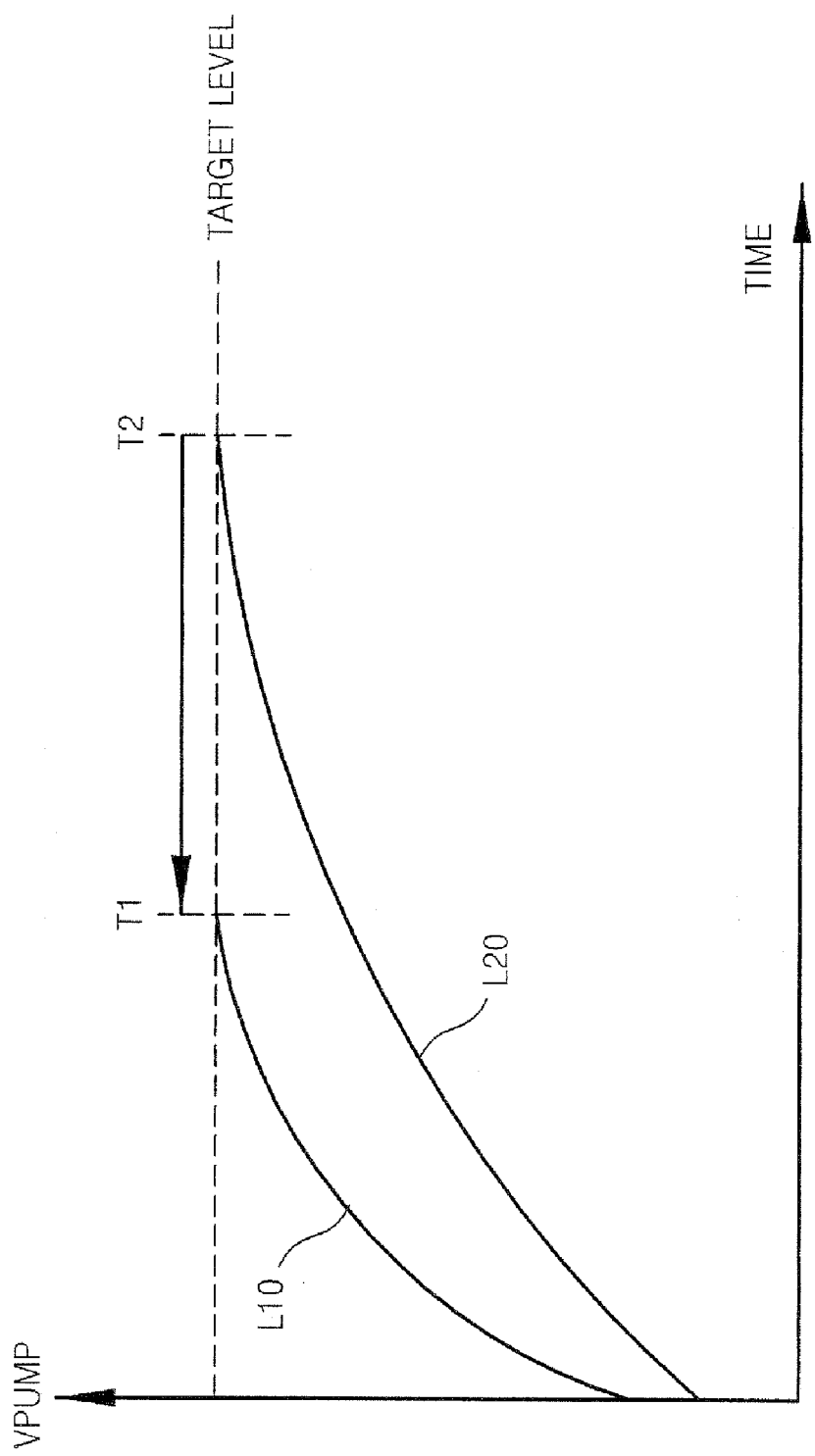
FIG. 8 is a graph showing a time to reach the target level of the pump output voltage.

FIG. 8 is a graph showing a time to reach the target level of the pump output voltage. L10 indicates the change of the pump output voltage VPUMP by the high voltage generation circuit according an embodiment. L20 indicates the change of the pump output voltage VPUMP by the high voltage generation circuit shown in FIGS. 6A and 6B.

As shown by L10, the pump output voltage VPUMP having a target voltage level is generated in less time as compared to the high voltage generation circuit of FIGS. 6A and 6B. The time for the pump output voltage VPUMP generated by the high voltage generation circuit as shown by L10 to reach the target voltage level is T1. The time for the pump output voltage VPUMP generated by the high voltage generation circuit of FIGS. 6A and 6B to reach the target voltage level is T2. As can be seen, T1 is much smaller than T2. Thus, according to an embodiment, whenever the charge pump circuit is enabled from a disabled state, the pump output voltage can reach the target voltage level in less time.

An embodiment may be used for generating a high voltage in a device in which the operation voltage is low or the power consumption is considered important. In particular, the high voltage generation circuit according to the embodiment can be included in a semiconductor memory device designed to operate at a decreased power voltage. The semiconductor memory device receives a relatively low level power voltage and generates a high voltage using the high voltage generation circuit. If the semiconductor memory device is a flash memory, the high voltage can be used to erase a memory cell.

As described above, according to an embodiment, when the charge pump circuit is disabled, the charge pump output node is separated from the node outside the charge pump circuit. As a result, the charge on the capacitors in the charge pump circuit can be preserved. Thus, when the charge pump circuit is enabled, the charges on the capacitors in the charge pump circuit are used to output a high voltage in less time. Therefore, the embodiment may be used in applications in which the operation voltage is low or the amount of power consumption is considered important, such as applications using batteries.

While the embodiments have been particularly shown and described with reference to the drawings, it will be understood by those skilled in the art that various changes in form and details may be made therein without departing from the spirit and scope as defined by the following claims.

What is claimed is:

1. A high voltage generation circuit, comprising:
a pump clock generation unit configured to generate a pump clock signal in response to a pumping enable signal;
a charge pump configured to generate a high voltage on an output in response to the pump clock signal; and
a switching unit to selectively couple the output of the charge pump to an output node in response to the pumping enable signal;
wherein the switching unit comprises:
a switching control unit configured to generate a switching control signal in response to the pumping enable signal; and
a switch configured to selectively couple the output of the charge pump to the output node in response to the switching control signal.

2. The high voltage generation circuit of claim 1, wherein the switching unit comprises a transistor coupled between the output of the charge pump and the output node and responsive to the pumping enable signal.

3. The high voltage generation circuit of claim 2, wherein the transistor is a depletion mode transistor.

4. The high voltage generation circuit of claim 2, wherein the transistor is an enhancement mode transistor.

5. The high voltage generation circuit of claim 1, wherein the switch comprises a transistor coupled between the output of the charge pump and the output node and responsive to the switching control signal.

6. The high voltage generation circuit of claim 1, wherein the switching control signal is substantially equal to the high voltage when the charge pump is enabled in response to the pumping enable signal.

7. The high voltage generation circuit of claim 1, wherein the switching control signal is substantially equal to a ground voltage when the charge pump is disabled in response to the pumping enable signal.

8. The high voltage generation circuit of claim 1, wherein the switching control signal is greater than the high voltage when the charge pump is enabled in response to the pumping enable signal.

9. The high voltage generation circuit of claim 1, wherein the switching control unit is coupled to the output node and configured to selectively provide a voltage on the output node as the switching control signal in response to the pumping enable signal.

10. The high voltage generation circuit of claim 1, wherein the pump clock generation unit comprises a disable path unit configured to discharge the output node to a power supply when the charge pump is disabled in response to the pumping enable signal.

11. The high voltage generation circuit of claim 10, wherein the disable path unit comprises:
a first inverter configured to invert the pumping enable signal;
a second inverter configured to invert the inverted pumping enable signal;
a first transistor having a gate coupled to an output of the second inverter, and a source coupled to the power supply; and
a second transistor having a gate coupled to an output of the first inverter, a drain coupled to a drain of the first transistor, and a source coupled to the output node.

12. The high voltage generation circuit of claim 1, wherein the pump clock generation unit comprises:
a voltage divider configured to selectively divide a voltage on the output node or pass the voltage on the output node in response to pumping enable signal;
a comparator configured to compare a reference voltage and an output of the voltage divider; and
a logic unit to generate the pump clock signal in response to an output of the comparator and a clock signal.

13. A semiconductor device comprising:
a circuit configured to receive a high voltage; and
a high voltage generation circuit configured to generate the high voltage;
wherein the high voltage generation circuit includes:
a pump clock generation unit configured to generate a pump clock signal in response to a pumping enable signal;
a charge pump configured to generate the high voltage on an output in response to the pump clock signal; and
a switching unit to selectively couple the output of the charge pump to an output node in response to the pumping enable signal; and
the pump clock generation unit comprises:
a voltage divider configured to selectively divide a voltage on the output node in response to pumping enable signal;
a comparator configured to compare a reference voltage and an output of the voltage divider; and
a logic unit to generate the pump clock signal in response to an output of the comparator and a clock signal.

14. The semiconductor device of claim 13, wherein the switching unit comprises:
a switching control unit configured to generate a switching control signal in response to the pumping enable signal; and
a switch configured to selectively couple the output of the charge pump to the output node in response to the switching control signal.

15. A high voltage generation circuit, comprising:
a pump clock generation unit configured to generate a pump clock signal in response to a pumping enable signal;
a charge pump configured to generate a high voltage on an output in response to the pump clock signal; and
a switching unit to selectively couple the output of the charge pump to an output node in response to the pumping enable signal;
wherein the pump clock generation unit comprises a disable path unit configured to discharge the output node to a power supply when the charge pump is disabled in response to the pumping enable signal.

16. The high voltage generation circuit of claim 15, wherein the pump clock generation unit further comprises:
- a voltage divider configured to selectively divide a voltage on the output node or pass the voltage on the output node in response to pumping enable signal;
- a comparator configured to compare a reference voltage and an output of the voltage divider; and
- a logic unit to generate the pump clock signal in response to an output of the comparator and a clock signal.

17. A high voltage generation circuit, comprising:
- a pump clock generation unit configured to generate a pump clock signal in response to a pumping enable signal;
- a charge pump configured to generate a high voltage on an output in response to the pump clock signal; and
- a switching unit to selectively couple the output of the charge pump to an output node in response to the pumping enable signal;
wherein the pump clock generation unit comprises:
- a voltage divider configured to selectively divide a voltage on the output node or pass the voltage on the output node in response to pumping enable signal;
- a comparator configured to compare a reference voltage and an output of the voltage divider; and
- a logic unit to generate the pump clock signal in response to an output of the comparator and a clock signal.

18. A semiconductor device comprising:
a circuit configured to receive a high voltage; and
a high voltage generation circuit configured to generate the high voltage;
wherein the high voltage generation circuit includes:
- a pump clock generation unit configured to generate a pump clock signal in response to a pumping enable signal;
- a charge pump configured to generate the high voltage on an output in response to the pump clock signal; and
- a switching unit to selectively couple the output of the charge pump to an output node in response to the pumping enable signal, the switching unit comprising:
  - a switching control unit configured to generate a switching control signal in response to the pumping enable signal; and
  - a switch configured to selectively couple the output of the charge pump to the output node in response to the switching control signal.

* * * * *

UNITED STATES PATENT AND TRADEMARK OFFICE
CERTIFICATE OF CORRECTION

PATENT NO.       : 7,439,792 B2                                          Page 1 of 1
APPLICATION NO.  : 11/549411
DATED            : October 21, 2008
INVENTOR(S)      : Pan-Suk Kwak et al.

It is certified that error appears in the above-identified patent and that said Letters Patent is hereby corrected as shown below:

Column 2, line 35, the word "PUMP$_{13}$ CLK" should read -- PUMP_CLK --;

Column 4, line 28, the word "10" should read -- 110 --.

Signed and Sealed this

Sixteenth Day of December, 2008

JON W. DUDAS
*Director of the United States Patent and Trademark Office*